(12) United States Patent
Imaida

(10) Patent No.: US 8,046,822 B2
(45) Date of Patent: Oct. 25, 2011

(54) ELECTRONIC APPARATUS, FUNCTION SELECTION METHOD OF ELECTRONIC APPARATUS AND MANAGEMENT SYSTEM OF ELECTRONIC APPARATUS

(75) Inventor: Hideyuki Imaida, Tokyo (JP)

(73) Assignee: Sony Corporation, Tokyo (JP)

( * ) Notice: Subject to any disclaimer, the term of this patent is extended or adjusted under 35 U.S.C. 154(b) by 1000 days.

(21) Appl. No.: 11/444,671

(22) Filed: Jun. 1, 2006

(65) Prior Publication Data

US 2006/0277608 A1 Dec. 7, 2006

(30) Foreign Application Priority Data

Jun. 3, 2005 (JP) .............................. P2005-164432

(51) Int. Cl.
*G06F 21/00* (2006.01)

(52) U.S. Cl. .................. 726/2; 726/27; 726/29; 705/50; 705/56

(58) Field of Classification Search ........................ None
See application file for complete search history.

(56) References Cited

U.S. PATENT DOCUMENTS

| 5,579,479 | A | 11/1996 | Plum |
| 6,169,976 | B1 * | 1/2001 | Colosso ........................ 705/59 |
| 6,791,620 | B1 * | 9/2004 | Elswick et al. ............... 348/441 |
| 7,111,321 | B1 * | 9/2006 | Watts et al. ........................ 726/2 |
| 2002/0143568 | A1 * | 10/2002 | Nakamura et al. ................. 705/1 |
| 2003/0053815 | A1 | 3/2003 | Testardi et al. |
| 2004/0117845 | A1 | 6/2004 | Karaoguz et al. |
| 2005/0047573 | A1 * | 3/2005 | Cameron et al. ......... 379/201.12 |
| 2005/0172135 | A1 * | 8/2005 | Wiersma ........................ 713/182 |
| 2005/0229171 | A1 * | 10/2005 | Henry et al. .................. 717/168 |
| 2006/0064756 | A1 * | 3/2006 | Ebert .............................. 726/26 |

FOREIGN PATENT DOCUMENTS

DE 103 39 926 4/2004

(Continued)

OTHER PUBLICATIONS

Control panel or front panel. (2000). In Collins Dictionary of Computing. London:Collins. Retrieved from http://www.credoreference.com/entry/hcdcomp/control_panel_or_front_panel.*

(Continued)

*Primary Examiner* — Kambiz Zand
*Assistant Examiner* — Imhotep Durham
(74) *Attorney, Agent, or Firm* — Frommer Lawrence & Haug LLP; William S. Frommer; Ellen Marcie Emas

(57) ABSTRACT

An electronic apparatus includes a first apparatus that carries out a plurality of functions, and a second apparatus that is coupled to the first apparatus. The second apparatus comprises a control unit that includes a processing unit for supplying commands to the first apparatus for carrying out the selected one of the plurality of functions: a display driver for displaying on a display a screen utilized to select one of the plurality of functions; and a memory slot operable to receive a memory stick that includes a key file for activating at least one other function. When the key file is uninstalled, the plurality of functions executable by the first apparatus include basic functions, and alternatively when the key file is installed, the plurality of executable functions include both the basic functions and at least one other function upon the processing unit validating authorization data stored on the key file.

17 Claims, 10 Drawing Sheets

FOREIGN PATENT DOCUMENTS

| | | | |
|---|---|---|---|
| GB | 2268605 A * | 6/1993 | |
| GB | 2 393 064 | 3/2004 | |
| JP | 2001 268667 | 9/2001 | |
| JP | 2002 244959 | 8/2002 | |
| JP | 2002 258970 | 9/2002 | |
| JP | 2003 61046 | 2/2003 | |
| JP | 2003 67072 | 3/2003 | |
| JP | 2004 252931 | 9/2004 | |
| WO | WO 03065723 A2 * | 8/2003 | |

OTHER PUBLICATIONS

Database. (2001). In Hargrave's Communications Dictionary, Wiley.
database. (2001). In Hargrave's Communications Dictionary, Wiley. Hoboken, NJ: Wiley. http://www.credoreference.com/entry/hargravecomms/database.*
BVW-65: Betacam SP Studio Player with DT, Sony Corporation, http://web.archive.org/web/20040722125441/http://www.videoequipment.com/PDFs/BVW-65.pdf, Jul. 22, 2004.*
Flash memory. In Microsoft Computer Dictionary. Microsfot Press 2002.*
File. In Microsoft Computer Dictionary. Microsoft Press 2002.*
Anonymous: "High-bandwidth Digital Content Protection System" Digital Content Protection: HDCP 1.1 Specification, [Online] Jun. 9, 2003, XP002517268 Retrieved from the Internet: URL:http://www.digital-cp.com/files/static_page_files/D672E3A3-EF28-151F-63A2522CCC29DAF1/HDCPSpecificationRev1_1.pdf> [retrieved on Feb. 26, 2009].

* cited by examiner

21

22

FIG. 7A  Basic Functions Alone

|  | 1080 | | | | 720 |
|---|---|---|---|---|---|
|  | 422 | 444SQ | 444HQ | 422×2 | 422 |
| 23PsF | ✓ | ✓ | ✓ | ✓ | — |
| 24PsF | ✓ | ✓ | — | — | — |
| 25PsF | ✓ | ✓ | — | — | — |
| 29PsF | ✓ | ✓ | — | — | — |
| 50I | ✓ | ✓ | — | — | — |
| 59I | ✓ | ✓ | — | ✓ | — |
| 50P | — | — | — | — | — |
| 59P | — | — | — | — | — |
| 60P | — | — | — | — | — |

1080 23.98PsF 422

FIG. 7B  Optional Functions Added

|  | 1080 | | | | 720 |
|---|---|---|---|---|---|
|  | 422 | 444SQ | 444HQ | 422×2 | 422 |
| 23PsF | ✓ | ✓ | ✓ | ✓ | — |
| 24PsF | ✓ | ✓ | ✓ | ✓ | — |
| 25PsF | ✓ | ✓ | ✓ | ✓ | — |
| 29PsF | ✓ | ✓ | ✓ | ✓ | — |
| 50I | ✓ | ✓ | ✓ | ✓ | — |
| 59I | ✓ | ✓ | ✓ | ✓ | — |
| 50P | ✓ | — | — | — | ✓ |
| 59P | ✓ | — | — | — | ✓ |
| 60P | ✓ | — | — | — | — |

1080 23.98PsF 422

FIG. 8A  Basic Functions Alone
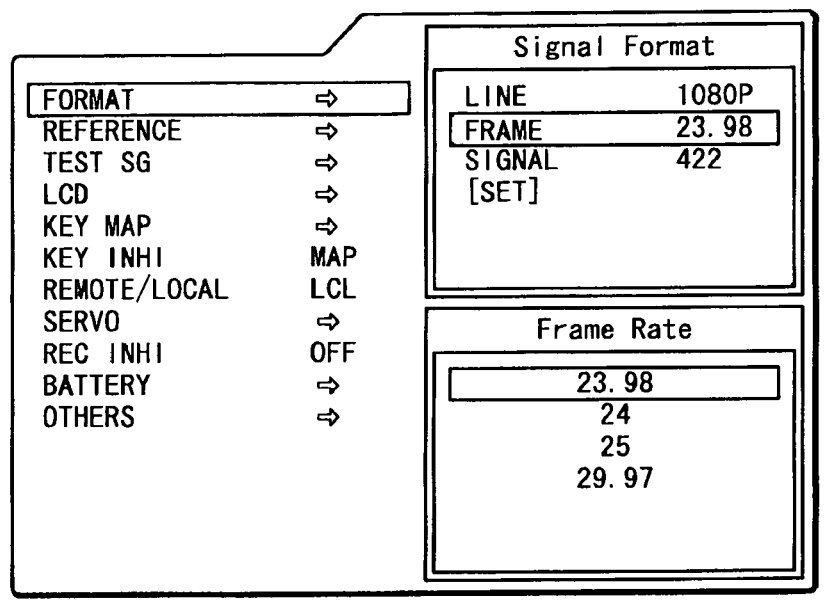
FIG. 8B  Optional Functions Added
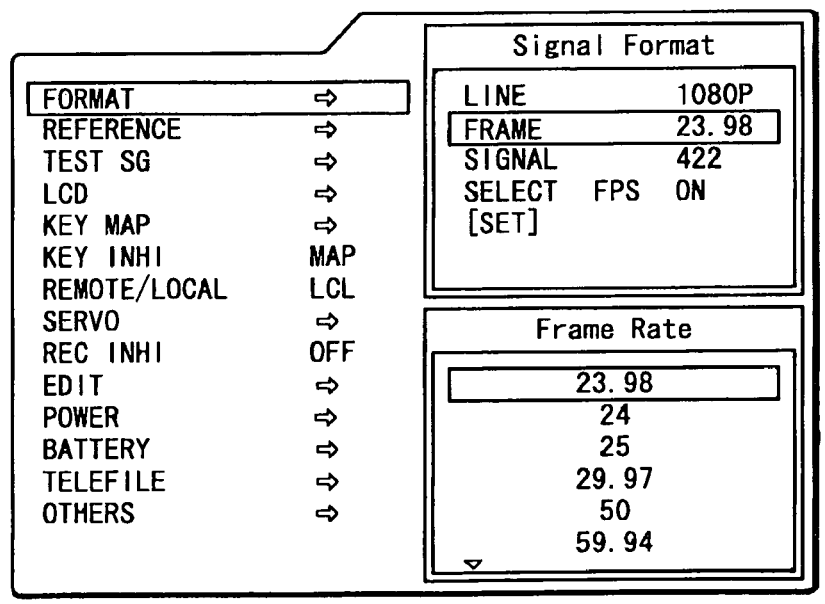

FIG. 9A  Basic Functions Alone
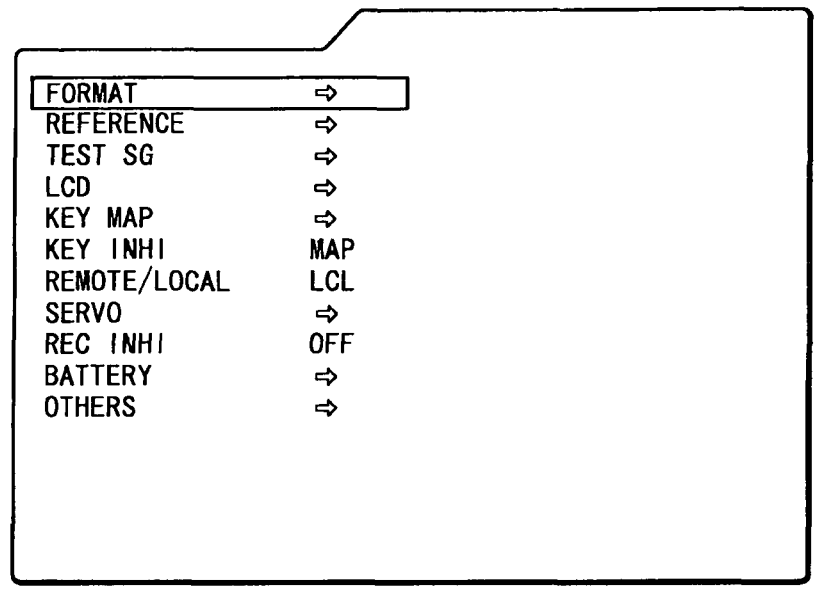
FIG. 9B  Optional Functions Added
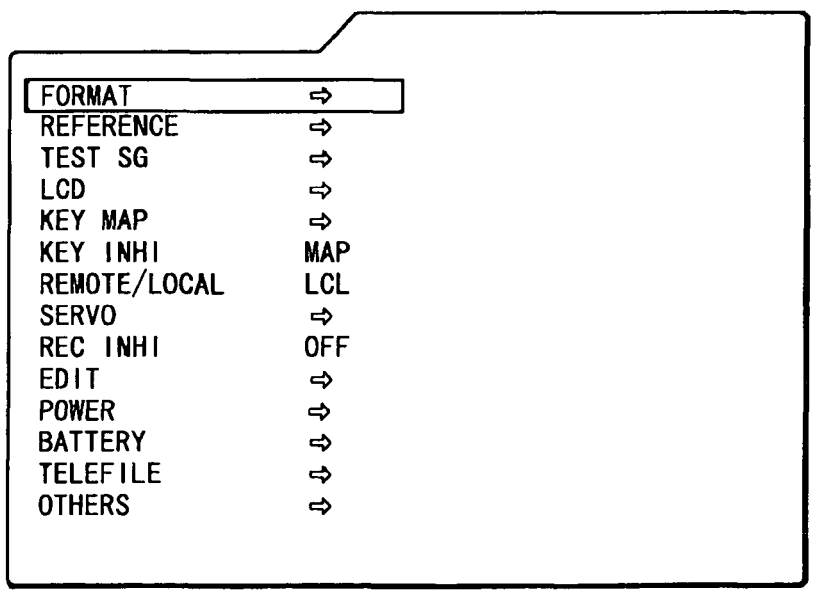

*FIG. 10A*  Basic Functions Alone
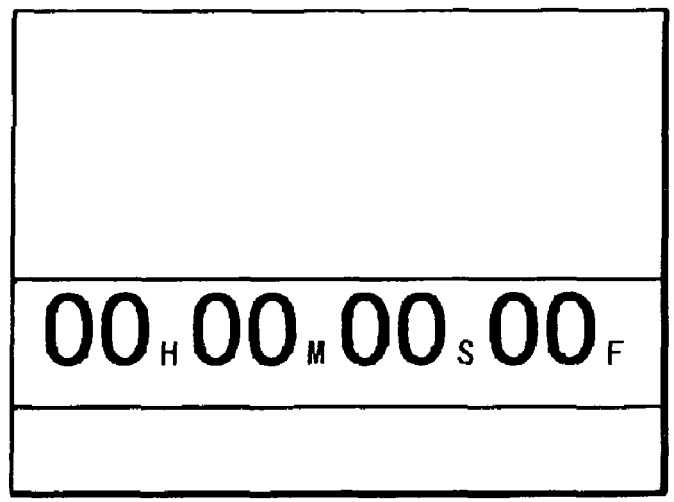
*FIG. 10B*  Optional Functions Added
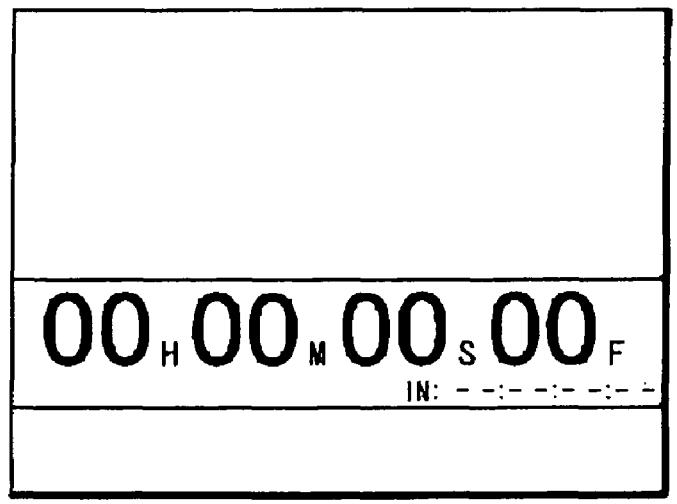

ELECTRONIC APPARATUS, FUNCTION SELECTION METHOD OF ELECTRONIC APPARATUS AND MANAGEMENT SYSTEM OF ELECTRONIC APPARATUS

CROSS REFERENCES TO RELATED APPLICATIONS

The present invention contains subject matter related to Japanese Patent Application JP 2005-164432 filed in the Japanese Patent Office on Jun. 3, 2005, the entire contents of which being incorporated herein by reference.

BACKGROUND OF THE INVENTION

1. Field of the Invention

The present invention relates to an electronic apparatus having a plurality of functions in which only a part of functions is generally available, remaining functions being individually made available as optional functions. Also, the present invention relates to a system for managing situations in which optional functions in such electronic apparatus are made available or unavailable.

2. Description of the Related Art

In most of electronic apparatuses, not only some basic functions are available but also optional functions are additionally made available as per user's requests.

In most of electronic apparatuses in which optional functions may be made available additionally, it has been customary that basic functions alone are mounted on the electronic apparatus, other apparatus having optional functions mounted thereon being attached to the electronic apparatus (see Cited Patent Reference 1, for example).

[Cited Patent Reference 1]: Japanese Published Patent Application No. 2002-283651 (paragraphs 0015-0017, FIG. 2)

SUMMARY OF THE INVENTION

However, as other embodiment of the electronic apparatus in which optional functions are made available additionally, there can be considered such an embodiment in which both of basic functions and optional functions are mounted on the electronic apparatus itself in advance such that basic functions alone are generally made available, the optional functions also being made available as per user's requests.

In the case of this embodiment, the following two conditions [a] and [b] may be considered as methods for setting the electronic apparatus to the state in which not only basic functions but also optional functions are made available.

[a] As software executed by a microprocessor to control the electronic apparatus, software is prepared for every electronic apparatus in accordance with user's request whether or not the user of the electronic apparatus wishes optional functions (type of optional functions if the user wishes the optional functions).

[b] At first, with respect to all electronic apparatuses, data that may designate only basic functions as available functions are written in advance in a memory (for example, a nonvolatile RAM (random-access memory)). Then, when a user wishes optional functions, data in the above-described memory may be rewritten so as to designate optional functions as available functions with respect to user's electronic apparatus.

However, according to the above-described method [a], each time a user wishes different optional functions, different software should be created, which increases a load on the design section of electronic apparatus.

Also, according to the above-described method [b], maintenance staff should visit the user in order to rewrite data, which increases a load on the maintenance section.

Further, according to the above-described method [b], When data to be rewritten is leaked, data in a memory of other electronic apparatus is written without permission and there is then the possibility that optional functions will become available in other electronic apparatus without permission. Therefore, even when design section of the electronic apparatus or the like intends to manage individual electronic apparatuses and the situations in which some optional functions are available or unavailable in such electronic apparatuses, it is unavoidable that such management will become difficult.

In view of the aforesaid aspects, according to the present invention, an electronic apparatus with basic functions and optional functions mounted thereon can be set to the state in which optional functions become available without imposing loads on the design section and the maintenance section. Also, it becomes possible to easily manage the situations in which optional functions of each electronic apparatus are made available or unavailable.

In order to solve the above-mentioned problems, according to the present invention, there is provided an electronic apparatus which includes a processing unit for executing a plurality of functions, a display unit for displaying a screen to select a function, an operation unit for selecting a function from a display screen of the display unit, a control unit for controlling display on the display unit and causing the processing unit to execute a function selected by the operation unit and an external interface. Then, the control unit causes the display unit to display a screen to select only part of function of a plurality of functions in the initialization state and the control unit determines by designating a serial number of the electronic apparatus to acquire authorization data permitting a use of any remaining function of a plurality of functions through the external interface whether or not the designated serial number is matched with its own serial number. Further, the control unit causes the display unit to display a screen to select the permitted function in addition to a part of function if it is determined that the designated serial number is matched with its own serial number.

In this electronic apparatus, in the initialization state, the screen to select only a part of functions of a plurality of functions is displayed on the display unit and a part of functions alone can be selected by the operation unit and such selected functions can be executed (that is, the electronic apparatus is set to the state in which a part of basic functions alone are made available).

However, when the authorization data for permitting a use of any remaining function is acquired through the external interface by designating the serial number of the electronic apparatus, it is checked whether or not the designated serial number is matched with its own serial number of the electronic apparatus. Then, if it is determined that the designated serial number is matched with the serial number of the electronic apparatus, then the screen to select permitted optional functions in addition to the basic functions is displayed on the display unit. As a result, the permitted optional functions also can be operated by the operation unit and the selected optional functions can be executed (that is, the electronic apparatus is set to the state in which optional functions also are made available).

Since this authorization data is small in data amount and simple in contents, it is sufficient that the authorization data should be issued to users of electronic apparatuses in the form of being inputted through the external interface. Accordingly, without imposing the loads on the design section and the maintenance section, the electronic apparatus in which basic functions and optional functions are mounted can be set to the state in which optional functions also are made available.

Also, since this authorization data designates the serial number of the electronic apparatus, optional functions of an electronic apparatus with a different serial number are not made available. Accordingly, it is possible to easily manage the situations in which optional functions of each electronic apparatus are made available or unavailable.

This relationship applies for the electronic apparatus function selecting method according to the present invention as well.

According to other aspect of the present invention, there is provided an electronic apparatus management system for use with an electronic apparatus. The electronic apparatus includes a processing unit for executing more than one basic functions and more than one optional functions, a display unit for displaying a screen to select a function, an operation unit for selecting a function from a display screen of the display unit, and an external interface and a control unit for controlling display on the display unit and causing the processing unit to execute a function selected by the operation unit. The control unit causes the display unit to display a screen to select only the basic function in the initialization state, the control unit determines by designating a serial number of the electronic apparatus to acquire authorization data permitting a use of any remaining optional function through the external interface whether or not the designated serial number is matched with its own serial number and the control unit causes the display unit to display a screen to select the permitted optional function in addition to the basic functions if it is determined that the designated serial number is matched with its own serial number. The electronic apparatus management system includes the steps of creating authorization data for permitting a use of any of the optional functions by designating a serial number of the electronic apparatus used by a user in response to user's request, issuing the authorization data to the user and storing the authorization data as a database.

According to this management system, in exactly the same manner as has already been described with respect to the electronic apparatus of the present invention, an electronic apparatus with basic functions and optional functions mounted thereon can be set to the state in which optional functions become available without imposing loads on the design section and the maintenance section. Also, it becomes possible to easily manage the situations in which optional functions of each electronic apparatus are made available or unavailable.

In accordance with a further aspect of the present invention, there is provided an electronic apparatus function selection method which includes of the steps of a step for displaying a screen to select part of function of a plurality of functions of an electronic apparatus in the initialization state and a step for designating a serial number of the electronic apparatus to acquire authorization data to permit a use of any remaining function of a plurality of functions through an external interface of the electronic apparatus. Further, there is also provided with a step for determining based on the acquired authorization data whether or not the designated serial number is matched with its own serial number and displaying a screen to select the permitted function in addition to a part of function if it is determined that the designated serial number is matched with its own serial number.

According to the present invention, an electronic apparatus with basic functions and optional functions mounted thereon can be set to the state in which optional functions become available without imposing loads on the design section and the maintenance section. Also, it becomes possible to easily manage the situations in which optional functions of each electronic apparatus are made available or unavailable.

BRIEF DESCRIPTION OF THE DRAWINGS

FIGS. 7A and 7B are respectively diagrams showing examples of the display screens of the control panel shown in FIG. 1 such that the state in which basic functions alone are available and the state in which not only basic functions but also optional functions are available are contrasted with each other;

FIGS. 8A and 8B are respectively diagrams showing examples of the display screens of the control panel shown in FIG. 1 such that the state in which basic functions alone are available and the state in which not only basic functions but also optional functions are available are contrasted with each other;

FIGS. 9A and 9B are respectively diagrams showing examples of the display screens of the control panel shown in FIG. 1 such that the state in which basic functions alone are available and the state in which not only basic functions but also optional functions are available are contrasted with each other;

FIGS. 10A and 10B are respectively diagrams showing examples of the display screens of the control panel shown in FIG. 1 such that the state in which basic functions alone are available and the state in which not only basic functions but also optional functions are available are contrasted with each other.

DESCRIPTION OF THE PREFERRED EMBODIMENTS

Embodiments in which the present invention is applied to a portable type VTR will be described below in concrete with reference to the drawings.

Figure 1:
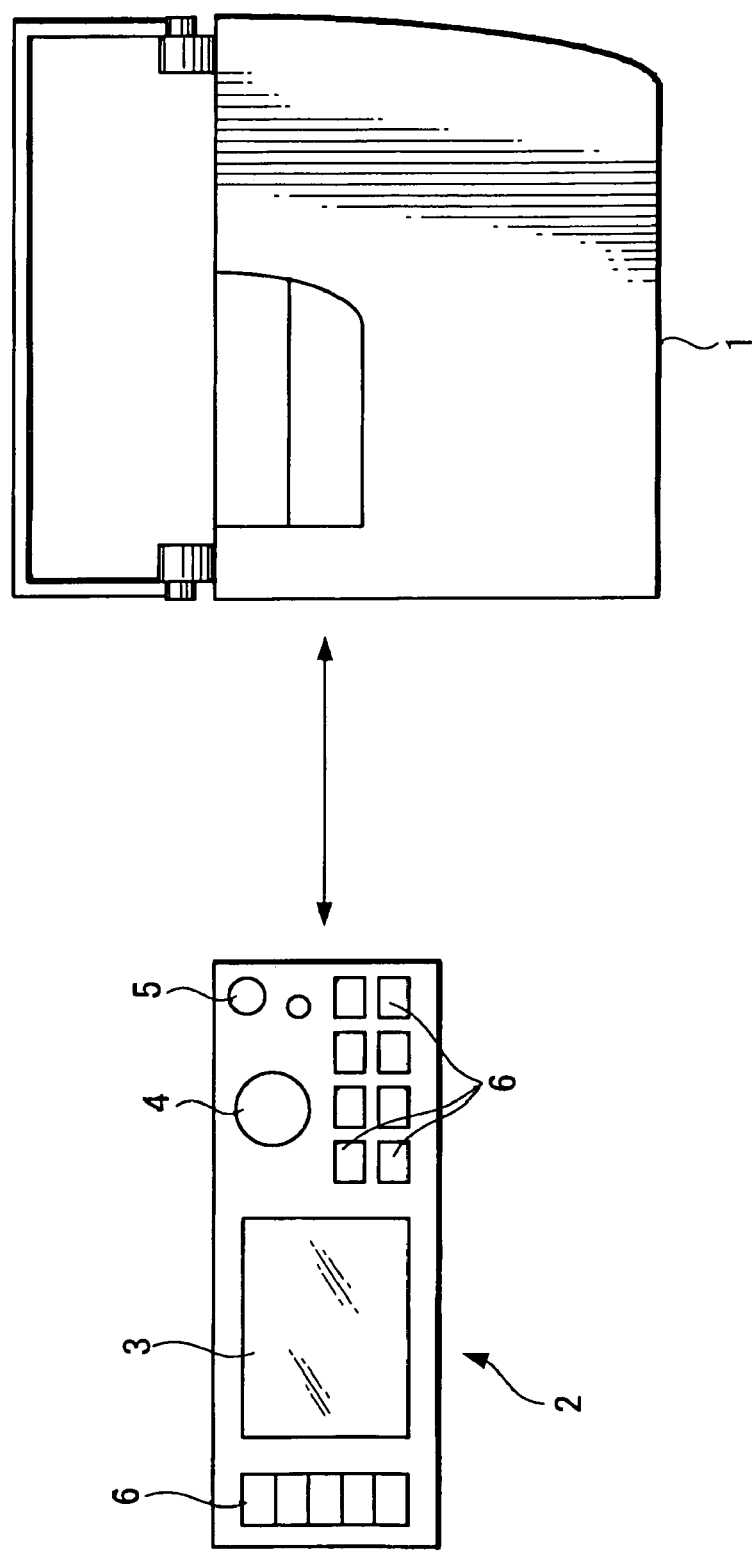
FIG. 1 is a schematic diagram showing an arrangement of an outward appearance of a VTR to which the present invention is applied.

FIG. 1 of the accompanying drawings is a schematic diagram showing an arrangement of an outward appearance of a VTR to which the present invention is applied. As shown in FIG. 1, a VTR has a VTR body 1 to which a control panel 2 is connected by a RS422 cable (not shown).

The VTR body 1 is a VTR applicable to multi-frame rate and it has a function to record and reproduce video data of a 1920×1080 image format with various frame rates such as 23.98P, 25*, 29.97P, 50i, 59.94i and a function to record and reproduce video data of a 1280×720 image format with a frame rate of 59.94P.

Although not shown, the VTR body 1 has a case and this case includes at its lower surface an attachment portion by which the broadcasting camera applicable to the VTR body 1 is detachably attached or the VTR body 1 is detachably attached to the upper surface of the video I/O unit and terminals by which video data can be inputted and outputted between the broadcasting camera attached to the VTR body 1 by the above attachment portion or the video I/O unit and the VTR body 1.

Figure 2A:
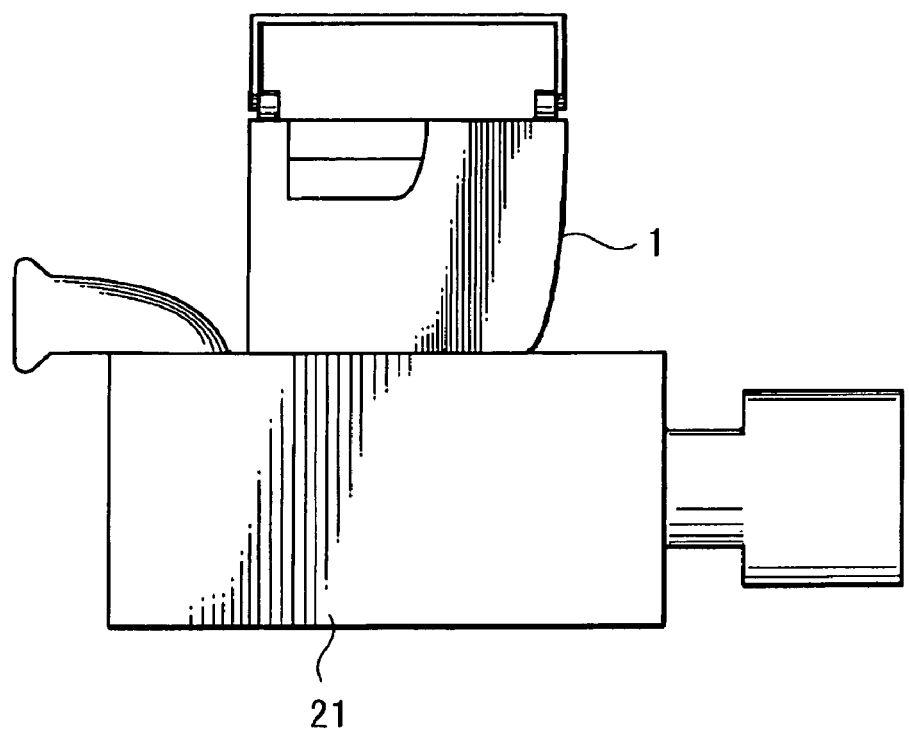
FIG. 2A is a schematic diagram showing the state in which a VTR body of the VTR shown in FIG. 1 is attached to a broadcasting camera.
Figure 2B:
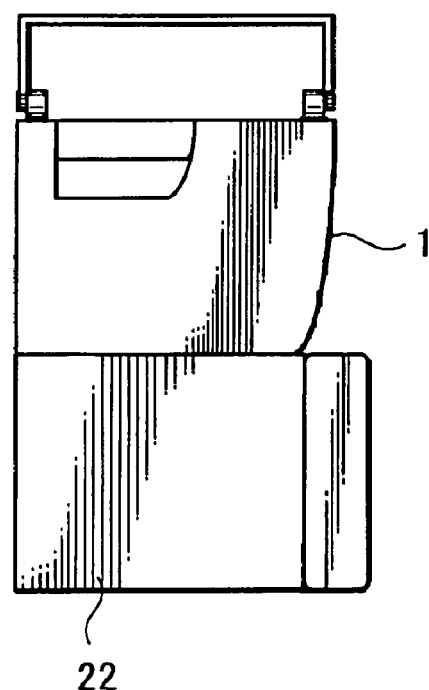
FIG. 2B is a schematic diagram showing the state in which the above-mentioned VTR body is attached to a video I/O (input and output) unit.

FIGS. 2A and 2B are schematic diagrams showing the state in which the VTR body 1 is attached to the broadcasting camera and the state in which the VTR body 1 is attached to the video I/O unit, respectively. In the state in which the VTR body 1 is attached to a broadcasting camera 21 as shown in FIG. 2A, video data shot by the broadcasting camera 21 can be recorded on the VTR body 1. On the other hand, a video I/O unit 22 shown in FIG. 2B includes a BNC terminal (not shown). In the state in which the VTR body 1 is attached to this video I/O unit 22 as shown in FIG. 2B, video data supplied to the video I/O unit 22 from an external apparatus (not shown) through a BNC cable (not shown) can be recorded on the VTR body 1 or video data reproduced by the VTR body 1 can be supplied through the BNC cable to the external apparatus.

The control panel shown in FIG. 1 is adapted to carry out various settings on the VTR body 1. Controls such as an LCD (liquid-crystal display) 3, a volume (variable resistor) 4, a jog dial 5 and keys 6 are provided on the top surface of the case of the control panel 2 as shown in FIG. 1. These controls are used to carry out various operations such as to turn on and turn off the power supply of the control panel 2, to select menu and functions and the like from the display screen of the LCD 3 and to enter characters and the like onto the screen of the LCD 3. Also, an insertion slot into which a memory stick, which is a kind of a small-sized memory card, is inserted is formed on the side surface of the case of the control panel 2.

Figure 3:
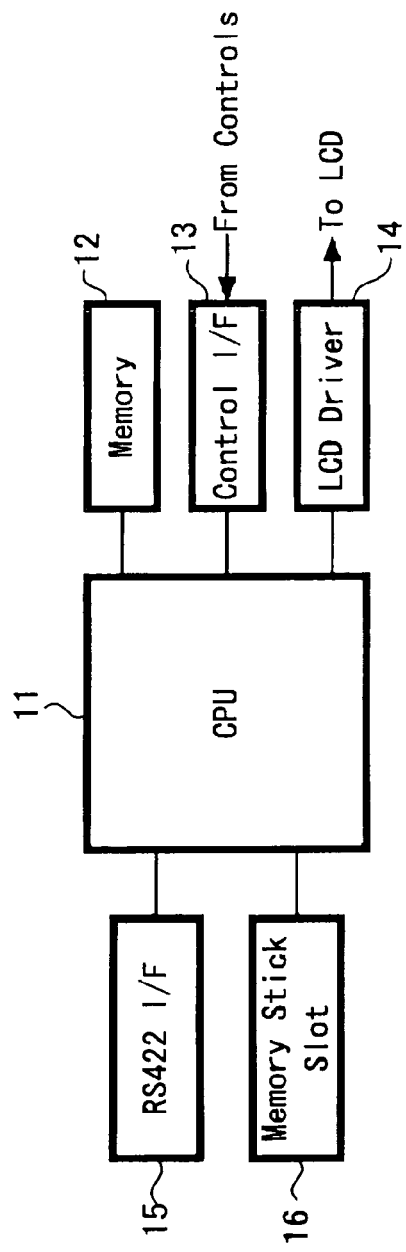
FIG. 3 is a block diagram showing a circuit arrangement of the control panel shown in FIG. 1.

FIG. 3 is a block diagram showing a circuit arrangement of the control panel 2. As shown in FIG. 3, a CPU (central processing unit) 11 is connected with a memory 12, an interface 13 to connect the controls such as the volume 4, the jog dial 5 and the keys 6 shown in FIG. 6, an LCD (liquid-crystal display) driver 14 for driving the LCD 3 shown in FIG. 1, an RS422 interface 15 and a memory stick slot 16.

The memory 12 stores therein software executed by the CPU 11 and various data may be stored in the memory 12 by the processing in the CPU 11.

In the initialization state (in the state in which key file, which will be described later on, is not installed), the CPU 11 displays a screen to select only part of frame rate of the aforementioned frame rates of the VTR body 1 on the LCD 3.

Further, although the VTR body 1 has a function to carry out cue-up by designating an edit-in IN, a power save function (function to control supply of electrical power to inactive circuits) and a function to write and read data between it and an IC (integrated circuit) memory attached to a video cassette, the CPU 11 may not display screens to select these functions on the LCD 3 shown in FIG. 1 in the initialization state.

As described above, in the initialization state, the CPU 11 displays a screen to select only part of function (basic function) of various functions of the VTR body 1 on the LCD 3.

Then, when a user operates the VTR body 1 to select a certain function from the basic functions displayed on the screen, the CPU 11 supplies a command to cause the VTR body 1 to execute the selected function through the RS422 interface 15 to the VTR body 1.

As described above, in the initialization state, only the basic functions of the VTR body 1 are available.

Figure 4:
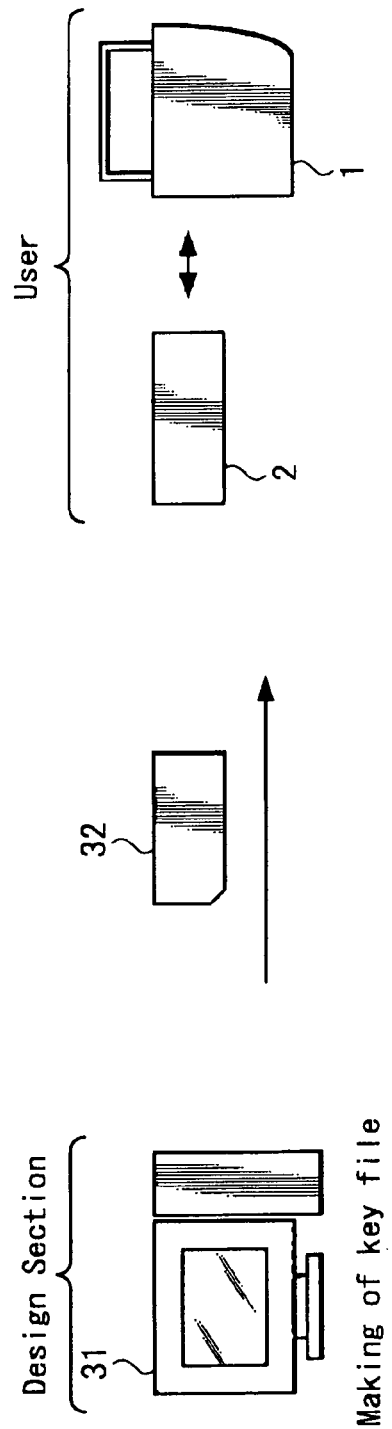
FIG. 4 is a schematic diagram showing an example of a management system for managing the situation under which the optional function of the VTR body shown in FIG. 1 is in use.

Remaining functions of the VTR body 1 may individually become available as optional functions as per user's request and the like. FIG. 4 is a schematic diagram showing a system by which the situations in which optional functions of individual VTR bodies 1 are used can be used.

As shown in FIG. 4, when a design section of the VTR body 1 and the control panel 2 (hereinafter simply referred to as a "design section") receives a request to use any one of optional functions from a certain user, the design section causes a personal computer 31 to create data file containing the following items (a) to (f) as authorization data to permit a use of such optional function.

[a] Serial numbers (manufacturer's serial number of each VTR body 1) of one or more than two VTR bodies 1 that the user requests a use of optional function;
[b] Version of the control panel 2 informed only to the user;
[c] Version of the control panel 2 used by the user;
[d] Optional function requested by the user;
[e] Term of validity in which a use of optional function is permitted; and
[f] Information indicating permission of use of optional function only in the state in which the VTR body 1 is attached to the broadcasting camera as shown in FIG. 2A.

Of the items [a] to [f] of the above authorization data, the items [a] and [d] are indispensable items and remaining items may be omitted.

A file of this authorization data is a file that becomes a key to activate inactive optional functions and hence this file will be described below as an "Activation Key" or a "Key File".

Having encrypted the thus created key file in accordance with an encryption algorithm such as MD-5, the design section saves this encrypted key file in the personal computer 31 as database and it saves this encrypted key file in the memory stick 32 so that the encrypted key file may be issued to the user.

The user attaches this memory stick 32 to the control panel 32 and selects a menu to install the key file from the menu screen displayed on the LCD 3 of the control panel 2.

Figure 5:
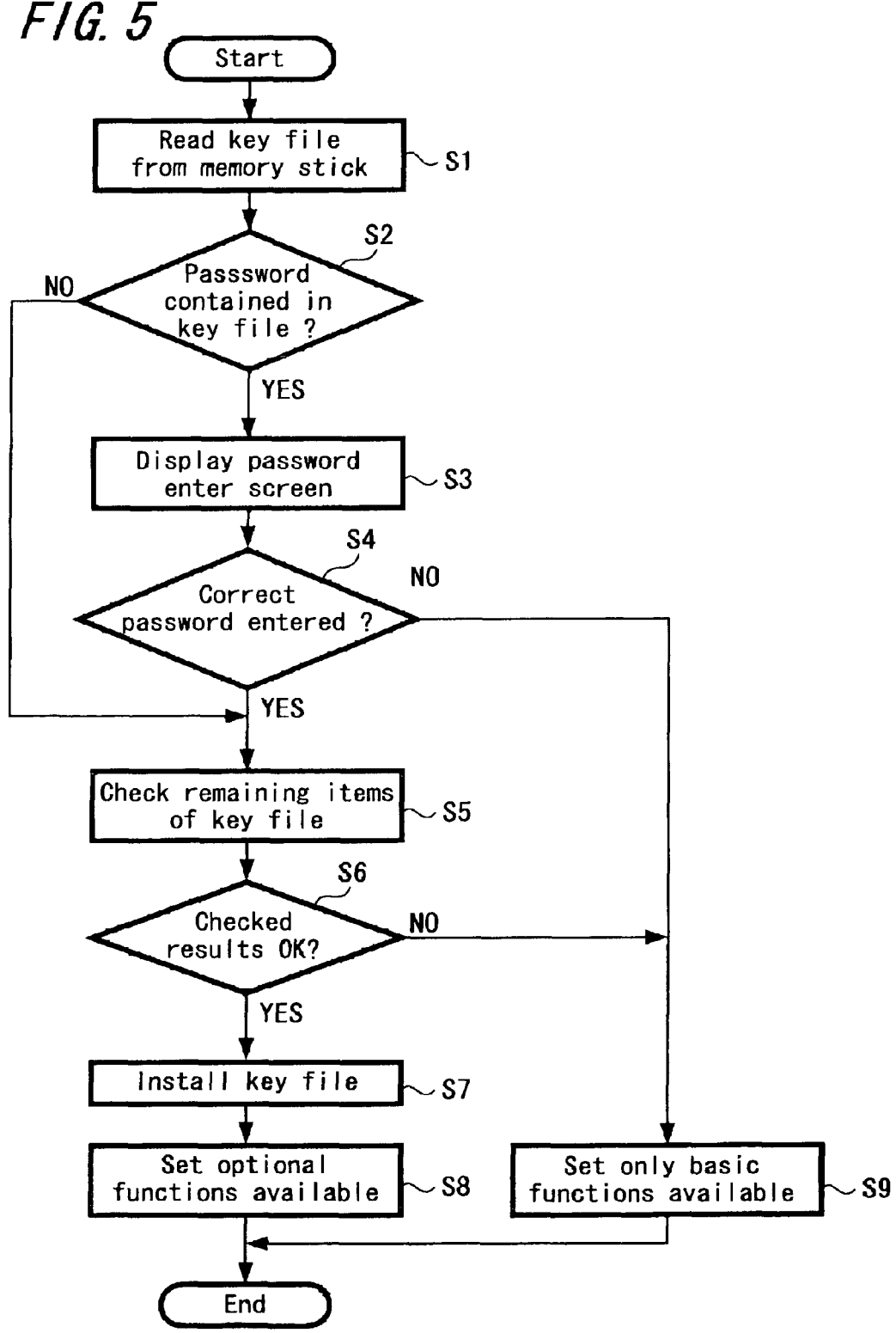
FIG. 5 is a flowchart showing function setting processing executed by the CPU (central processing unit) shown in FIG. 3.

FIG. 5 is a flowchart to which reference will be made in explaining function setting processing that the CPU 11 shown in FIG. 3 executes in response to selection of this menu.

Referring to FIG. 5, and following the start of operation, control goes to a step S1, in which a key file is read out from the memory stick 32 through the memory stick slot 16. Then, control goes to the next decision step S2, whereat it is determined whether or not the key file contains the above-described item [b] (password).

If the key file contains the item [b] (password) as represented by a YES at the decision step S2, then control goes to a step S3. In the step S3, a screen to enter a password is displayed on the LCD 3 (FIG. 1). Then, control goes to the next decision step S4, whereat it is determined whether or not a correct password is entered into the screen. If the correct password is entered into the screen as represented by a YES at the decision step S4, then control goes to a step S5.

If on the other hand a password is not contained in the key file as represented by a NO at the decision step S2, then control goes to the step S5. In the step S5, the remaining items of the key file are checked. More specifically, information of a serial number is acquired from the VTR body 1 connected to the control panel 2 through the RS422 interface 15 (FIG. 3) and it is checked whether or not the thus acquired serial number is matched with the serial number contained in the key file as the above-described item [a].

If the above-described item [c] (version of the control panel 2) is contained in the key file, then it is checked whether or not a version of its own control panel 2 is matched with the version contained in the key file as the item [c].

Also, it is checked whether or not the optional function contained in the key file as the item [d] is matched with the function that the VTR body 1 possesses as its optional function.

Also, if the above-described item [e] (term of validity) is contained in the key file, then it is checked whether or not the present date is matched with a date within the term of validity contained in the key file as the item [e].

Further, if the above-described item [f] is contained in the key file, then information indicative of a apparatus to which the VTR body 1 is attached is acquired from the VTR body 1 connected to the control panel 2 through the RS422 interface. Then, it is checked whether or not the apparatus is the broadcasting camera.

Then, control goes from this step S5 to the next decision step S6. In the decision step S6, it is determined whether or not checked results are affirmative. If the checked results are affirmative as represented by a YES at the decision step S6, then control goes to a step S7, whereat the thus read out key file is installed in the memory 12 (FIG. 3).

Then, control goes to the next step S8, whereat the setting of the VTR body is changed in order to display a screen to select an optional function contained in the key file as the above-described item [d] in addition to the basic functions when various screens are displayed on the LCD 3 (that is, the VTR body is set in such a manner that, of the optional functions of the VTR body 1, the optional function contained in the key file as the above-described item [d] can be used. Then, control is ended.

If a NO is outputted at the decision step S4 or S6, then control goes to a step S9, whereat the VTR body is set in such a manner that only the basic functions of the VTR body 1 are made available similarly to the initialization state. Then, control is ended.

After the step S8 was executed, if a function is selected from the optional functions displayed on the screen of the LCD 3, then the CPU 11 supplies a command to cause the VTR body 1 to execute the selected function through the interface 15 to the VTR body 1. Thus, the optional function of the VTR body 1 becomes available.

Each time the power supply of the control panel 2 is turned on after the key file was installed by the processing shown in FIG. 5, the CPU 11 reads out the installed key file and executes the processing in the same way as the steps S2 to S6 shown in FIG. 5. Then, if a YES is outputted at the decision step S6, then the same processing as that in the step S8 is carried out. If a NO is outputted at the decision step S4 or S6, then the same processing as that in the step S9 is carried out. As described above, each time the power supply of the control panel 2 is turned on after the key file was installed by the processing shown in FIG. 5, the function is set by checking the key file.

Also, the key file installed by the processing shown in FIG. 5 may be uninstalled by selecting a menu to uninstall the key file from the menu screen displayed on the LCD 3 of the control panel 2.

Figure 6:
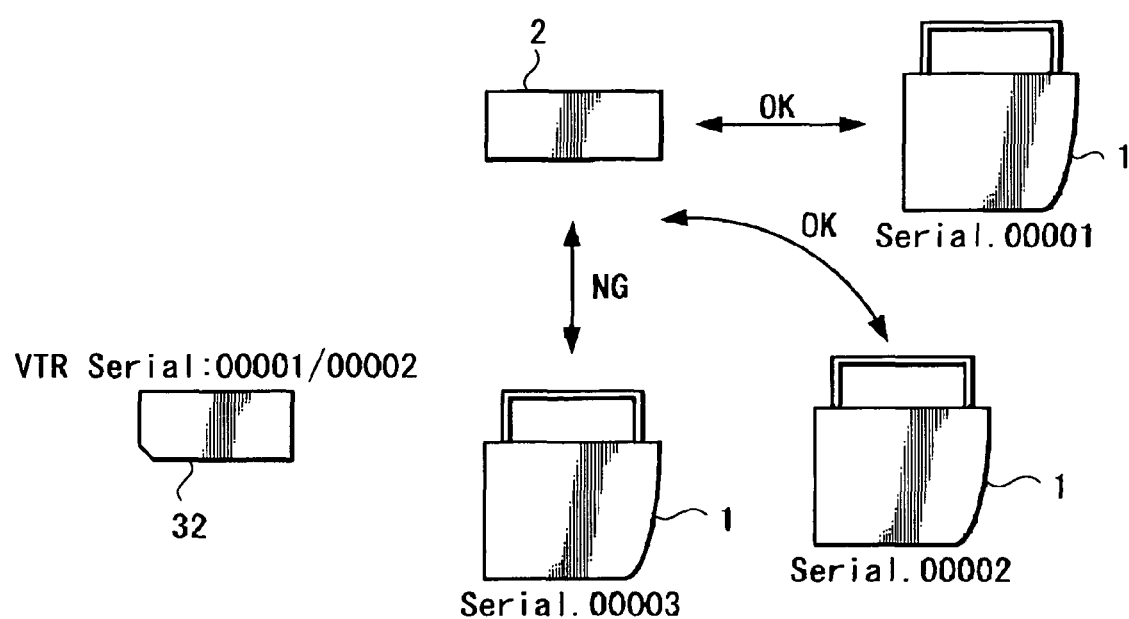
FIG. 6 is a schematic diagram showing checked results obtained when serial numbers were checked.

FIG. 6 is a diagram showing an example of results obtained when serial numbers were checked by checking the key file in the processing shown in FIG. 5 or when the power supply of the control panel 2 was turned on later (after the key file was installed). As shown in FIG. 6, if serial numbers contained in the key file as the above-described items are two serial numbers of 00001 and 00002, for example, then when the control panel 2 is connected to the VTR body 1 of which the serial number is 00001 or 00002, checked results with respect to the serial numbers are affirmative. Accordingly, if checked results of other items are affirmative, then it is possible to use optional functions of the VTR bodies 1 of the serial-numbers 00001 and 00002.

When on the other hand the control panel 2 is connected to the VTR body 1 of which serial number is 00003, the checked results with respect to the serial numbers are negative. Accordingly, it is not possible to use the optional function of the VTR body 1 with the serial number 00003.

As described above, since the key file designates the serial number of the VTR body 1, an optional function of a VTR body 1 with a different serial number is not made available. Accordingly, it is possible for the design section to easily manage the specific serial number of the VTR body 1 and the kind of available optional functions.

Also, when the above-described item [e] (term of validity) is contained in the key file, even if the checked results with respect to the serial numbers are affirmative, after the term of validity was expired, it is not possible to use the optional function of the VTR body 1. Accordingly, when it is intended to demonstrate the optional function to the user, the optional function of the VTR body 1 can be used only during a constant period. Also, when the VTR body 1 and the control panel 2, for example, are rented to the user, it is possible to make the optional function of the VTR body 1 become available only during the rental period of the VTR body 1 and the control panel 2.

Further, when the above-described item [c] (version of the control panel 2) is contained in the key file, the control panel 2 of which version is different from the above version is not able to use the optional function of the VTR body 1. Accordingly, it is possible to make the optional function become available with respect to only the VTR body 1 connected to the control panel 2 of a specific version.

FIGS. 7A, 7B, FIGS. 8A, 8B, FIGS. 9A, 9B and FIGS. 10A and 10B are respectively diagrams showing examples of the display screens of the control panel shown in FIG. 1 such that the state in which basic functions alone are available and the state in which not only basic functions but also optional functions are available are contrasted with each other.

FIGS. 7A and 7B show examples in which formats that can be selected are displayed in the form of a list. As mentioned before, the VTR body 1 has a function to record and reproduce video data of a 1920×1080 image format at various frame rates such as 23.98P, 24P, 25P, 25.97P and 50i, 59.94i and a function to record and reproduce video data of a 1280×720 image format at a frame rate of 59.94P. However, in the initialization state, as shown in FIG. 7A, the VTR body 1 has a basic function capable of recording and reproducing video data of the 1920×1080 image format at only selected frame rates denoted by V-like check marks in FIG. 7A.

On the other hand, in the state in which the optional function also is set to be available, as shown in FIG. 7B, a variety of frame rates (frame rates denoted by V-like check marks) that can be selected with respect to video data of 1920×1080 image format can be added and video data of 1280×720 image format can be recorded and reproduced by selecting the frame rates denoted by the V-like check marks.

FIGS. 8A and 8B show examples of selectable frames rates displayed when a menu "FORMAT" to select a format on the menu screen is selected. FIG. 8A shows examples of frame rates that can be selected in the initialization state and FIG. 8B shows examples of frame rates that can be selected in the state in which optional functions also are made available. In this example, as shown in FIG. 8B, frame rates 50i and 59.94i are added as optional functions and displayed on the menu screen.

FIGS. 9A and 9B show examples of menus displayed on the menu screen. FIG. 9A shows examples of menus displayed on the menu screen in the initialization state and FIG. 9B shows examples of menus displayed on the menu screen in the state in which optional functions also are made available. In this example, as shown in FIG. 9B, "EDIT" that is a function to make cue-up by designating edit-in (IN point), "POWER" that is a power save function and "TELEFILE" that is a function to read and write data between the VTR body 1 and the IC memory attached to the video cassette are added as optional functions and displayed on the menu screen.

FIGS. 10A and 10B show examples of time code portions displayed when video data is reproduced (other portions of the time code are not shown for simplicity), respectively. FIG. 10A shows examples of time code portions displayed on the time code screen in the initialization state and FIG. 10B shows examples of time code portions display on the time code screen in which an optional function also is made available. In this example, a mark-in function that is a function to designate the current time code as edit-in (IN-point) to make cue-up is made available as an optional function. As shown in FIG. 10B, a section to display a time code designated by the mark-in function is provided on the lower right of the display position of the time codes.

As described above, according to the present invention, it is possible for the design section of the VTR body 1 and the control panel 2 to easily manage the specific serial number of VTR body 1 and the kind of available optional functions.

Then, since the key file is small in data amount and simple in contents, it can be made with ease and it can be issued to users by a suitable transportation method such as mailing in the form of the small media like the memory stick. Accordingly, without imposing loads on the design section and the maintenance section, it is possible to set the VTR body 1 to the state in which optional functions also are made available.

In the above-mentioned example, as shown in FIG. 4, the design section of the VTR body 1 and the control panel 2 creates the key file and issues the thus created key file to the users to thereby manage the situation in which optional functions of the VTR body 1 are available or unavailable. However, the present invention is not limited to the above-mentioned example and the functions to create and issue the key files and the function to manage the situation in which optional functions of the VTR body 1 are available or unavailable may be transferred to a server and thereby automated.

Figure 11:
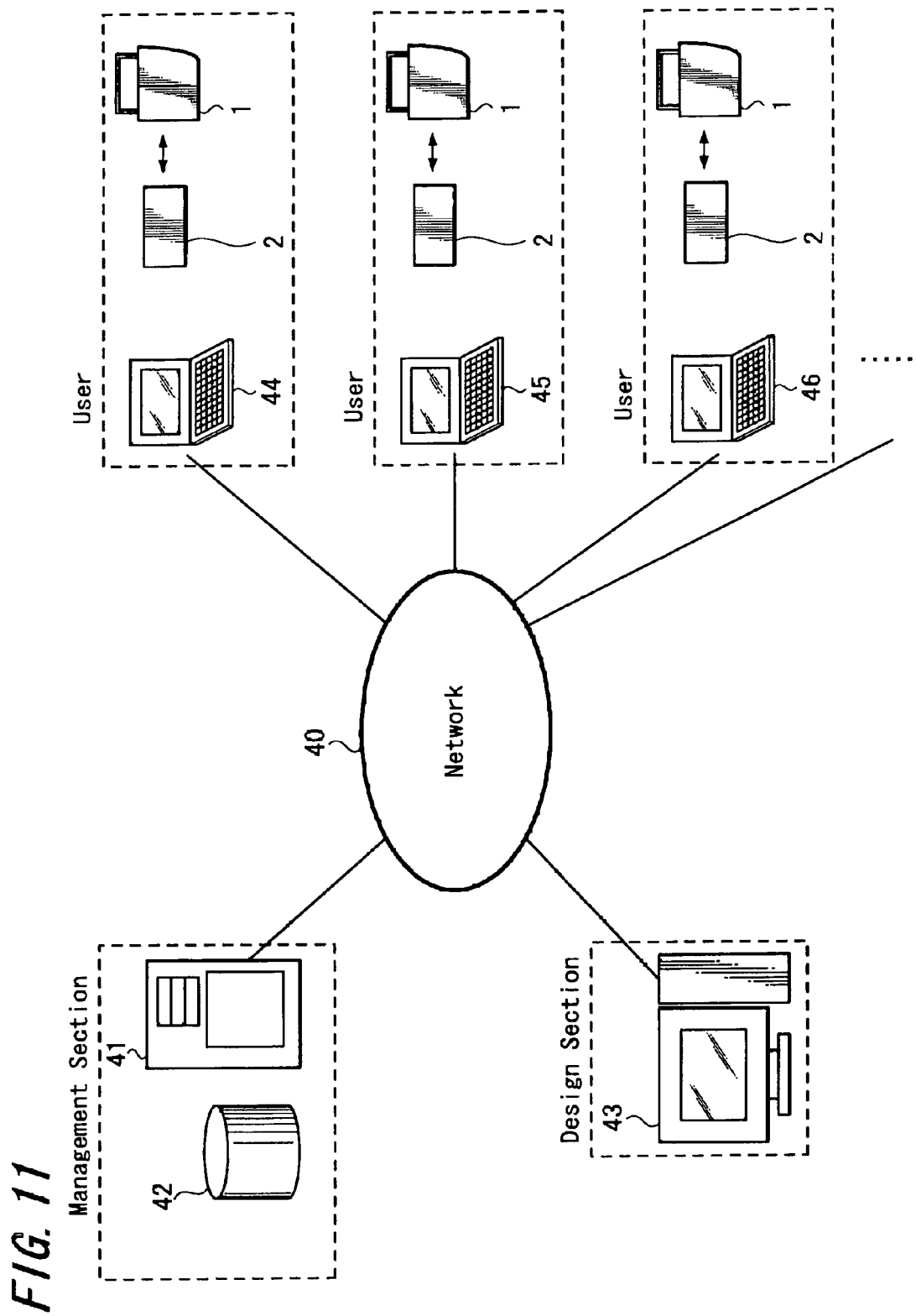
FIG. 11 is a schematic diagram showing another example of a management system for managing the situation under which the optional functions of the VTR body shown in FIG. 1 are in use.

FIG. 11 is a diagram showing an example of such management system. As shown in FIG. 11, a server 41 for a management section, a personal computer 43 for a design section and user personal computers 44, 45, 46 . . . are connected to a network (for example, the Internet) 40.

The server 41 automatically creates a key file in response to access made by a user requesting a use of optional functions. Then, the server 41 issues the thus created key file to the user personal computers 44, 45, 46 . . . via the network 40 and also saves the key file in a database 42.

The user stores the key file received at the personal computer in the memory stick and the user mounts the memory stick to the control panel 2.

The design section accesses the server 41 by the personal computer 43 and reads key files saved in the database 42 to thereby confirm the situations in which optional functions of individual VTR bodies 1 are available or unavailable.

According to this management system, without troubling the design section at all, it is possible to set the VTR body 1 to the state in which optional functions also are made available. Further, if the server 41 has accounting and settlement functions, then without troubling the design section at all, it is possible to realize a business in which key files with terms of validity are issued to all users in order to demonstrate optional functions, for example, whereafter key files for an indefinite period are issued to those who wish to use optional functions formally and accounting and settlement are executed between the management system and the user.

In the above-mentioned embodiments, the present invention is applied to the portable type VTR in which the control panel 2 is connected to the VTR body 1. However, the present invention is not limited to the above-mentioned portable type VTR and may be applied to a VTR in which a VTR body and a control panel are integrally formed as one body, a frame mounted type VTR, recording and reproducing apparatus having a plurality of functions other than the VTR and electronic apparatuses having a plurality of functions other than recording and reproducing apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
    a first apparatus, for recording and reproducing video data, operable to carry out a plurality of functions; and
    a second apparatus coupled to the first apparatus, the second apparatus operable to enable the first apparatus to execute a selected one of the plurality of functions, wherein the second apparatus comprises a control unit, the control unit including:
        a processing unit for supplying commands, to the first apparatus, for carrying out the selected one of the plurality of functions;
        a display driver for displaying, on a display, a screen utilized to select one of the plurality of functions; and
        a memory slot operable to receive a memory stick that includes a key file for activating an additional apparatus function, the additional apparatus function stored in the key file,
    wherein
        when the key file is uninstalled in the second apparatus, the plurality of functions executable by the first apparatus include basic apparatus functions, and
        when the key file is installed in the second apparatus, the plurality of functions executable by the first apparatus include both the basic apparatus functions and the additional apparatus function upon the processing unit validating authorization data stored in the key file,
    wherein validating the authorization data by the processing unit includes:
        matching a serial number, associated with the first apparatus, with a serial number located in the key file,
        matching a version, associated with the second apparatus, with a version located in the key file, and
        matching the selected additional apparatus function stored in the key file with a stored apparatus function in the first apparatus.

2. The apparatus according to claim 1, wherein the authorization data includes a password such that the display driver displays a screen on the display for entering the password and, wherein if a user of the apparatus enters the wrong password, the plurality of functions executable by the first apparatus are limited to the basic apparatus functions.

3. The apparatus according to claim 1, wherein the authorization data includes a term of validity in which a use of the additional apparatus function is permitted, wherein during the validating of the authorization data it is checked whether a present date is within the term of validity.

4. The apparatus according to claim 1, wherein the first apparatus is a VTR body.

5. The apparatus according to claim 4, further comprising a camera coupled to the VTR body.

6. The apparatus according to claim 1, wherein the control unit further comprises an interface for:
   acquiring the serial number associated with the first apparatus from the first apparatus via the interface; and
   providing the supplied commands to the first apparatus for carrying out the selected one of the plurality of functions.

7. The apparatus according to claim 1, wherein the first and the second apparatus comprise a design section, such that upon the design section receiving a request to utilize the additional apparatus function, the design section:
   encrypts the key file; and
   saves the encrypted key file to a personal computer, wherein the personal computer saves the encrypted key file to the memory stick.

8. An electronic apparatus management system comprising:
   a first apparatus, for recording and reproducing video data, operable to carry out a plurality of functions;
   a second apparatus coupled to the first apparatus, the second apparatus operable to enable the first apparatus to execute a selected one of the plurality of functions, wherein the second apparatus comprises a control unit, the control unit including:
      a processing unit for supplying commands, to the first apparatus, for carrying out the selected one of the plurality of functions; and
      a memory slot operable to receive a memory stick that includes a key file for activating an additional apparatus function the additional apparatus function stored in the key file,
   a network; and
   a management section operable to store the key file, wherein the key file is accessed via the network by at least one user computer such that the at least one user computer saves the key file to the memory stick,
   wherein
      when the key file is uninstalled in the second apparatus, the plurality of functions executable by the first apparatus include basic apparatus functions, and
      when the key file is installed in the second apparatus via the memory slot, the plurality of functions executable by the first apparatus include both the basic apparatus functions and the additional apparatus function upon the processing unit validating authorization data stored in the key file,
   wherein validating the authorization data by the processing unit includes:
      matching a serial number, associated with the first apparatus, with a serial number located in the key file,
      matching a version, associated with the second apparatus, with a version located in the key file, and
      matching the additional apparatus function stored in the key file with a stored apparatus function stored in the first apparatus.

9. The electronic apparatus management system according to claim 8, wherein the management section comprises:
   a server; and
   a database coupled to the server, the server operable to store the key file, and
   whereby validating the authorization data by the processing unit includes matching a serial number associated with the first apparatus with a serial number located in the key file, and matching a version associated with the second apparatus with a version located in the key file.

10. The electronic apparatus management system according to claim 8, wherein the control unit further comprises a display driver for displaying on a display a screen utilized to select one of the plurality of functions.

11. A method of selecting an electronic apparatus function, the method comprising:
   determining whether a user has requested an additional apparatus function to that of a plurality of functions executable by a first electronic apparatus which records and reproduces video data;
   creating a key file based on determining that the additional apparatus function has been requested, wherein the key file includes authorization data and the additional apparatus function;
   installing the key file on a second electronic apparatus associated with the first electronic apparatus;
   checking the authorization data on the key file by:
      matching a serial number associated with the first apparatus with a serial number located in the key file,
      matching a version associated with the second apparatus with a version located in the key file, and
      matching a stored apparatus function in the first apparatus with the requested additional apparatus function stored in the key file; and
   displaying the requested additional apparatus function in addition to the plurality of functions based on an affirmative result corresponding to the checked authorization data, wherein in the absence of the affirmative result, only the plurality of functions are displayed.

12. The method according to claim 11, wherein checking the authorization data further comprises checking a term of validity associated with use of the requested additional apparatus function.

13. The method according to claim 11, further comprising:
   selecting the displayed additional apparatus function;
   supplying commands corresponding to the selected additional apparatus function from the second electronic apparatus to the first electronic apparatus; and
   executing the supplied commands at the first electronic apparatus.

14. The method according to claim 11, wherein the first electronic apparatus comprises a VTR body.

15. The method according to claim 11, wherein the first electronic apparatus is coupled to a camera.

16. The method according to claim 11, wherein the first electronic apparatus is couple to a video I/O unit.

17. The method according to claim 11, wherein checking the authorization data further comprises:
   determining whether the key file contains a password;
   displaying a screen to enter a password if the key file contains a password; and
   determining whether the password contained in the key file matches a password entered by a user, wherein if the password contained in the key file and the entered password match, the additional apparatus function becomes available to the user by displaying the requested additional apparatus function in addition to the plurality of functions.

* * * * *